United States Patent [19]
Nishiyama

[11] Patent Number: 5,467,167
[45] Date of Patent: Nov. 14, 1995

[54] IMAGING DEVICE

[75] Inventor: Masataka Nishiyama, Tokyo, Japan

[73] Assignee: Asahi Kogaku Kogyo Kabushiki Kaisha, Tokyo, Japan

[21] Appl. No.: 297,422

[22] Filed: Aug. 5, 1994

Related U.S. Application Data

[63] Continuation of Ser. No. 943,783, Sep. 11, 1992, abandoned.

[30] Foreign Application Priority Data

Sep. 12, 1991 [JP] Japan .................................. 3-261010
Sep. 12, 1991 [JP] Japan .................................. 3-261011

[51] Int. Cl.$^6$ .................................. G01D 15/16; H04N 1/46
[52] U.S. Cl. .................................. 355/75; 355/27; 355/233; 347/232; 347/119
[58] Field of Search .................................. 355/233, 235, 355/75; 346/160, 153.1, 108, 135.1

[56] References Cited

U.S. PATENT DOCUMENTS 4,847,110  7/1989  Nakajima et al. .................. 427/25
4,978,976  12/1990  Okino .................................. 346/108
5,151,714  9/1992  Okino et al. ........................ 346/108

*Primary Examiner*—Michael L. Gellner
*Assistant Examiner*—D. P. Malley
*Attorney, Agent, or Firm*—Kane, Dalsimer, Sullivan, Kurucz, Levy, Eisele and Richard

[57] ABSTRACT

Disclosed is an imaging device which uses a recording paper composed of a base paper exhibiting a color and a photoconductlvely-color-changing layer formed thereon and includes an optical system for introducing a light having a specific wavelength to the recording paper based on image information. The photoconductively-color-changing layer is composed of a photoconductively-color-changing agent having the characteristic that the agent usually exhibits a specific color different from that of the base layer and is changed to colorless and transparent by being irradiated with the light having the specific wavelength.

10 Claims, 4 Drawing Sheets

IMAGING DEVICE

This application is a continuation of application Ser. No. 07/943,783, filed Sep. 11, 1992, now abandoned.

BACKGROUND OF THE INVENTION

The present invention relates to an imaging device such as a copy machine, printer and the like for forming an image on a recording paper.

Recently, many imaging devices such as copy machines, printers and the like for forming an image on a recording paper use an electrophotographic method.

In the electrophotographic method, the surface of a uniformly charged electrostatic photoconductive material is exposed; a latent image is formed to a portion of the photoconductive material from which electric charges are removed; toner is deposited to the latent image to form a toner image (visible image); and then this toner image is transferred onto a recording paper.

This imaging device making use of the electrophotographic method such as, for example, a laser beam printer is provided with a cylindrical photoconductive drum having a surface formed of an electrostatic photoconductive material. The photoconductive drum is rotated at a predetermined circumferential speed. There are disposed around the photoconductive drum as a center a cleaning mechanism for cleaning toner remaining on the surface of the photoconductive drum; a corona changer for uniformly charging the photoconductive material on the surface of the photoconductive drum; a scanning optical system for exposing and scanning the surface of the photoconductive drum with a laser beam turned ON and OFF in response to image information; a development unit for depositing toner to a portion of the photoconductive material from which electric charges are removed by exposure and made to a latent image and making the latent image to a toner image; and a transfer charger for charging a recording paper and transferring the toner image thereon, respectively. Further, a fixing unit for fixing the toner image on the recording paper is disposed at a location to which the recording paper onto which the toner image is transferred by the transfer charger is fed.

Further, the copy machine is provided with a scanning and irradiating unit for scanning and irradiating a document placed on a document placing unit in place of the above scanning and optical system; and an optical system for introducing a light reflected from the document irradiated by the scanning and irradiating unit onto the surface of a photoconductive drum.

The above imaging device making use of the electrophotographic method has such a complex process that a latent image is formed by irradiating the photoconductive material of a photoconductive drum with a light having image information and the latent image is developed by being deposited with toner and further transferred onto a recording paper. Thus, a problem arises in that the structure of the 1mating device is made inevitably complex due to the complex processes and the size of the imaging device is difficult to be reduced.

On the other hand, recently, a photoconductively-color-changing agent is developed and attracts attention as toner to be used for image formation. The photoconductively-color-changing agent; usually exhibits a specific color and when irradiated with a light having a specific wavelength, this color is irreversibly changed to colorless and transparent. An article entitled "Trends." in "NIKKEI MECHANICAL" dated Jul. 22, 1991 discloses such a photoconductively-color-changing agent.

This photoconductively-color-changing agent includes, for example, a mixture of cyanine type pigment exhibiting blue color IR820B and organic born ammonium salt. When near infrared rays of 820 nm are irradiated to the photoconductively-color-changing agent, the blue color disappears and the photoconductively-color-changing agent becomes colorless and transparent. This phenomenon is described as follows. That is, the IR820B absorbs the near infrared rays having the wavelength of 820 nm and thus the characteristic of the IR820B to selectively reflects only a blue monochromatic light is changed to cause lights of all the wave lengths to pass therethrough. At this time, the organic boron ammonium salt acts as a catalyst to make this phenomenon irreversible.

When this photoconductively-color-changing agent is used as toner by an imaging device making use of the electrophotographic method for the formation of an image, it is contemplated to irradiate a light having a specific wavelength to a recording paper onto which information has been recorded and to cause the information disappear therefrom so that the recording paper can be used again. However, there has been no idea to provide a novel imaging device by making use of the photoconductively-color-changing agent.

SUMMARY OF THE INVENTION

It is therefore an object of the present invention to provide a recording paper used for an imaging device, which has the characteristic that it exhibits a specific color, and when irradiated with a light having a specific wavelength, it is changed to colorless and transparent.

Furthermore, it is therefore the other object of the present invention to provide an improved imaging device having a novel and simple arrangement, by making use of a photoconductively-color-changing agent having the characteristic that it exhibits a specific color, and when irradiated with a light having a specific wavelength, it is changed to color less arid transparent.

For the above object, according to the present invention, there is provided a recording paper used for an imaging device, comprising: a base paper exhibiting a color; and a photoconductively-color-changing layer formed of a photoconductively-color-changing agent having the characteristic -that said agent usually exhibits a specific color different from that of said base paper and is changed to colorless and transparent by being irradiated with a light having a specific wavelength, said photoconductively-color-changing layer being formed on the surface of said base paper.

Furthermore, in order to achieve the above object, there is provided an imaging device which uses a recording paper composed of the base paper and the photoconductively-color-changing layer formed thereon and comprises an optical system for introducing a light having said specific wavelength to said recording paper based on image information, recording paper holding means for holding said recording paper, and a light source for emitting the light having said specific wavelength an optical system.

With the above arrangement, an image can be obtained only by drawing it on a recording paper and thus mechanisms for transferring and fixing the image are not necessary. As a result, the imaging device can be very simply arranged.

DESCRIPTION OF THE EMBODIMENTS

Embodiments of the present invention will be described below with reference to the drawings.

Figure 1:
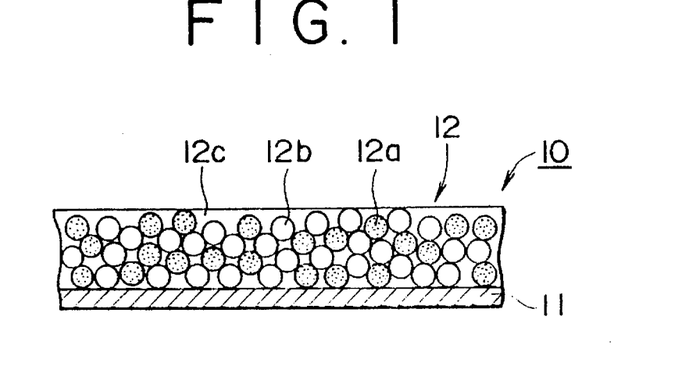
FIG. 1 is an enlarged cross sectional view of an embodiment a recording paper used in an imaging device according to the present invention.

First, a recording paper used in imaging devices according to the present invention will be described with reference to FIGS. 1 to 3. A recording paper 10 shown in FIG. 1 has a photoconductively-color-changing layer 12 formed on the surface of a base paper 11.

The photoeonduetlvely-color-changing layer 12 is formed on the surface of the base paper 11 to a predetermined thickness by binding and fixing the uniform mixture of the fine particles 12a . . . of cyanine type pigment IR820B and the fine particles 12b . . . of organic boron ammonium salt by binder 12c. The photoeonduetlvely-color-changing layer 12 usually exhibits a blue color by that the IR820B selectively reflects a blue monochromatic light.

The organic boron ammonium salt is comprised of, for example, tetrabutylammonlum butylphenylborate. The chemical formula of IR820B is shown below. These materials are shown in an article entitled "Trends" in "NIKKEI MECHANICAL" dated Jul. 22, 1991.

salt on the surface of the base paper 11.

Figure 2:
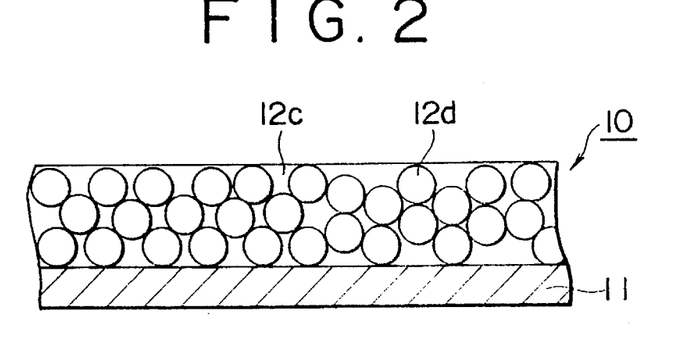
FIG. 2 is an enlarged cross sectional view of another embodiment of the recording paper.
Figure 3:
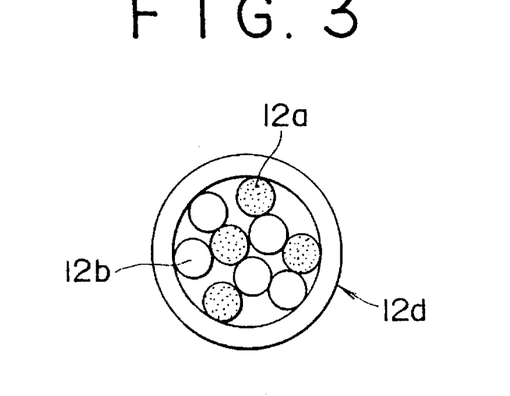
FIG. 3 is an enlarge cross sectional view of a transparent capsule for accommodating the photoconductively-color-changing agent for the recording paper.

FIG. 2 shows another embodiment of the recording paper. In this embodiment, the fine particles 12a . . . of cyanine type pigment IR820B and the fine particles 12b . . . of organic boron ammonium salt are sealed in transparent capsules 12d which are fixed on the base paper 11 by the binder 12c, as shown in the enlarged diagram of FIG. 3.

When letters or images are drawn on the photoconductlvely-color-changing layer 12 of the recording paper 10 as arranged above by the irradiation of near infrared rays with a wavelength of 820 nm, the portion of the photoconductlvely-color-changing layer 12 on which the letters or images are drawn (to which the near infrared rays are irradiated) is changed to colorless and transparent and the letters or images having the color of the base paper 11 with the blue of the IR820B as a base color. On the contrary, when the portion of the recording paper 10 other than the letters or images (the portion serving as the base portion) is irradiated with the near infrared rays with the wavelength of 820 rim, the letters or images having the blue of the IR820B appear with the color of the base paper 11 serving as the base color. In both cases, processes such as development, fixing and the like are not necessary. The photoconductively-color-changing layer may be preapplied to a base paper to form the recording paper, or, the recording paper may be formed in situ within the imaging device as described in the following.

Figure 4:
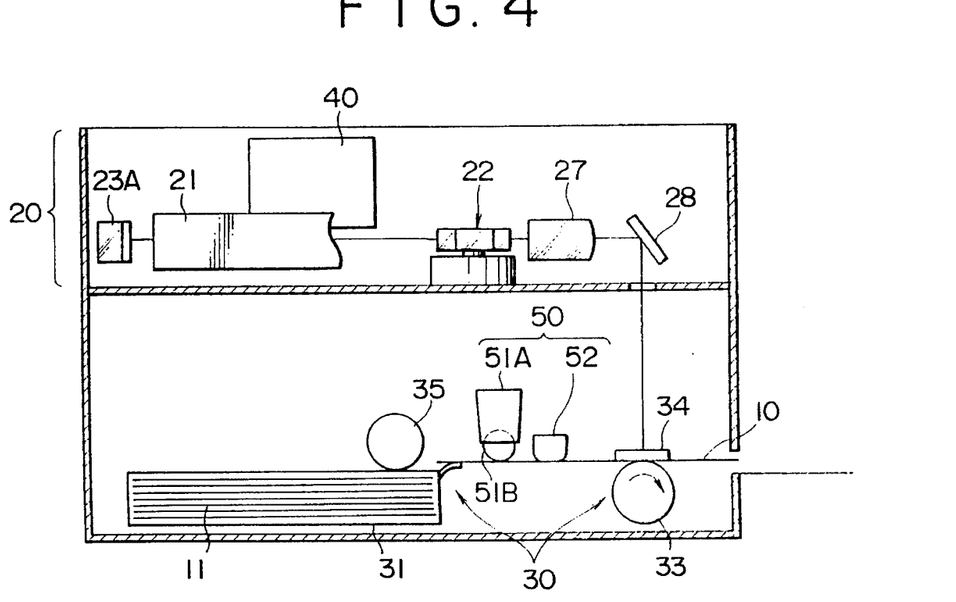
FIG. 4 is a diagram schematically showing the arrangement of a printer as an embodiment of an imaging device.
Figure 5:
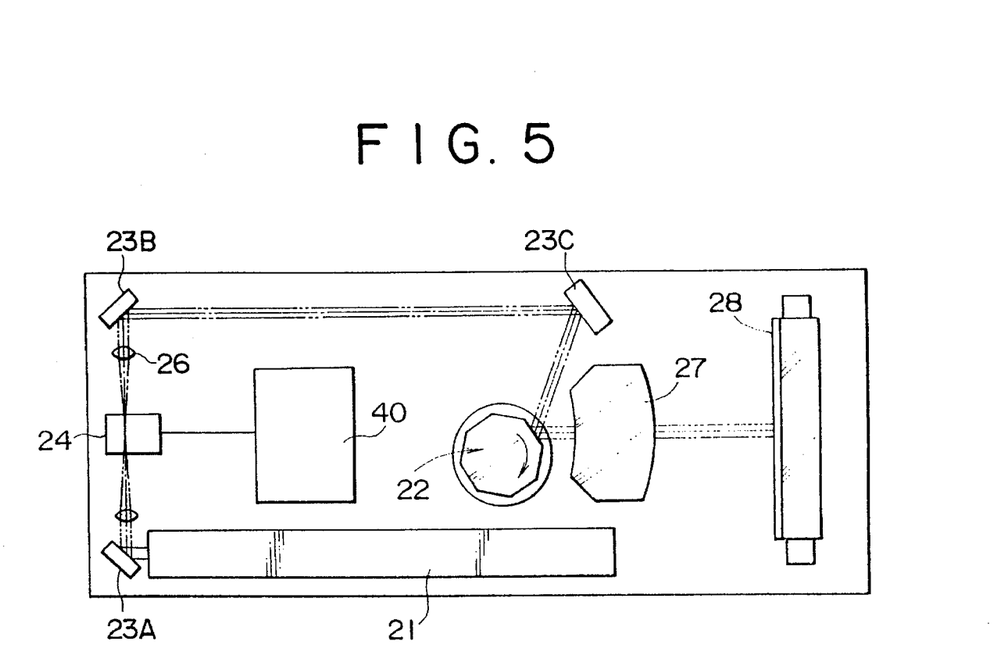
FIG. 5 is a plan view showing the schematic arrangement of a scanning optical system.

Next, a first embodiment of a printer as an imaging device using the above recording paper 10 will be described with reference to FIGS. 4 and 5 showing the schematic arrangement of the printer.

The printer shown in the figures is composed of a recording paper feed mechanism 30 for feeding the paper 11 as the base paper accommodated in a paper tray 31; a photoconductlvely-color-changing layer formation mechanism 50 for forming the photoconductively-color-changing layer 12 to the usual paper 11 being fed by the recording paper feed mechanism 30 and providing the recording paper 10; and a scanning optical system for scanning the recording paper 10 being fed by the recording paper feed mechanism 30 with a laser beam having a wave-length of 820 nm. The recording paper feed mechanism 30 is disposed at the lower portion of The base paper 11 is composed of a so-called usual paper and arranged to have a color different from that of the photoconductlvely-color-changing layer 12. In general, although the base paper 11 preferably selects a color having high contrast with respect to the blue of the photoconductlvely-color-changing layer 12, it may use a color having low contrast with respect to the blue such as black when used in a special application. Thus, the color of the base paper 11 may be arbitrarily set.

The binder 12c is composed of, for example, styrene acrylic copolymer and melted by being heated to bind and fix the fine particles 12a . . . of cyanine type pigment IR820B and the fine particles 12b . . . of organic boron ammonium the device, and the recording paper 10 is horizontally fed from the left side to the right side in FIG. 4. The scanning optical system 20 is disposed above the recording paper feed mechanism 30.

The printer according to the present invention is arranged such that the usual papers 11 accommodated in the base paper tray 31 are fed by l;he recording paper feed mechanism 30; the photoconductively-color-changing layer 12 is formed to the usual paper 11 being fed by the photoconductively-color-changing layer formation mechanism 50 to provide the recording paper 10; and an image is drawn by main-scanning the recording paper 10 by the movement thereof and sub-scanning the same by irradiating a laser beam having a wavelength of 820 nm to the recording paper 10 based on drawing information decomposed to dots. Note, hereinafter the usual paper 11 prior to the formation of the photoconductively-color-changing layer 12 and the recording paper 10 after the formation of the photoconductively-color-changing layer 12 are uniformly referred to as a recording paper except the case that they must be individually described.

The recording paper feed mechanism 30 is provided with an introduction roller 32 disposed above the base paper tray 31 and a feed roller 33 disposed at a position to which the recording paper 10 is fed. A flat-shaped cover glass 34 is horizontally disposed above the feed roller 33 in the close proximity of the circumferential surface of the feed roller 33. The recording paper 10 is fed between the feed roller 33 and the cover glass 34 at a feed speed set so that it is in synchronism with a laser beam scanning operation performed by the scanning optical system 20 to be described later.

The photoconductlvely-color-changing layer formation mechanism 50 is composed of a photoconductlvely-color-changing agent application mechanism 51 and a heater 52. The photoconductively-color-changing agent application mechanism 51 is disposed on the side from which the recording paper 10 is introduced. The heater 52 is disposed in the vicinity of the photoconductively-color-changing agent application mechanism 51 at a position to which the recording paper 10 is fed. Further, the photoconductively-color-changing layer formation mechanism 50 is disposed above a recording paper feed path from the base paper tray 31 to the feed roller 33.

The photoconductlvely-color-changing agent application mechanism 51 is composed of a color-changing agent box 51A for accommodating the photoconductively-color-changing agent and an application roller 51B disposed below the color-changing agent box. Each of the color-changing agent box 51A and application roller 51B has a length covering the entire width of the recording paper 10 perpendicular to the direction in which it is fed. The color-changing agent box 51A accommodates the photoconductively-color-changing agent as a fine particle mixture prepared by uniformly mixing the fine particles 12a . . . of cyanine type pigment IR820B, the fine particles 12b . . . of organic boron ammonium salt and binder at a predetermined ratio.

The heater 52 is heated to a predetermined temperature and disposed in the vicinity of the photoconductively -color-changing agent coating mechanism 51 on the downstream side thereof to which the recording paper is fed. As a result, the heater 52 comes into contact with the upper surface of the recording paper 10. Further, the heater 52 has a length covering the entire width of the recording paper 10 perpendicular to the direction in which it is fed.

As shown in the plan view of FIG. 5, the scanning optical system 20 is composed of a laser beam source 21 for emitting a laser beam having a wavelength of 820 nm; a rotatably disposed polygon mirror 22 for scanning the laser beam; a mirrors 23A, 23B and 23C for introducing the laser beam from the laser beam source 21 to the polygon mirror 22; a laser beam ON/OFF modulator 24 disposed on a laser beam path between the mirror 23 and the mirror 23B; a converging lens 25 disposed on the upstream side of the laser beam incident on the ON/OFF modulator 24; a collimator lens 26 disposed on the downstream side of the ON/OFF modulator 24 to which the laser beam is supplied; an fθ lens 27 for correcting the scanning speed of the laser beam scanned by the polygon mirror 22 to a given value; and a mirror 28 for introducing the scanning laser beam to the recording paper 10 fed by the recording paper feed mechanism 30.

The laser beam source 21 is composed of, for example, an aluminum gallium arsenic type (AlGaAs type) or gallium arsenic type (GaAs type) semiconductor laser.

The ON/OFF modulator 24 is controlled by a controller 40 and turns ON/OFF the laser beam (the laser beam is passed through or shut off).

The controller 40 decomposes image information input from a not shown computer or the like connected. thereto to dots and controls the ON/OFF modulator 24 based on the decomposed dots so that it is turned ON and OFF.

The printer arranged as described above will operate as described below.

The usual papers 11 accommodated in the base paper tray 31 are fed by the introduction roller 31 one by one to the feed roller 33. While the usual papers 11 are fed the photoconductively-color-changing layer 12 is formed on the surface thereof by the photoconductively-color-changing layer formation mechanism 50. Thus, the usual papers 11 are made to the recording papers 10. More specifically, the photoconductively-color-changing agent as the mixture of the fine particles of t;he cyanine type pigment IR820B, the fine particles of the organic boron ammonium salt and the binder accommodated in the color-changing agent box 51A is uniformly coated onto the entire upper surface of the recording paper 10 to a predetermined thickness by the coating roller 51B. Then, the coated photoconductively-color-changing agent is fixed onto the surface of the usual paper 11 by the binder which is melted by being heated by the heater 52.

On the other hand, a laser beam emitted from the laser beam source 21 of the scanning optical system 20 is incident on the ON/OFF modulator 24 through the mirror 23A and converging lens 25.

The ON/OFF modulator 24 is controlled by the controller 40 so that it is turned ON and OFF in synchronism with the scanning of the laser beam performed by the polygon mirror 22 to be described below. More specifically, the laser beam is turned ON and OFF in synchronism with the scanning of the laser beam based on the decomposed dot information of an image to be drawn.

The laser beam from the ON/OFF modulator 24 is returned to a parallel beam by the collimator lens 26 and introduced to the polygon mirror 22 through the mirrors 23B and 23C. Then, the parallel beam is reflected from the circumferential reflection surface of the polygon mirror 2 being rotated and scanned within the range of a predetermined angle.

The scanning laser beam passes through the cover glass 34 of the recording paper feed mechanism 30 through the fθ lens 27 and mirror 28. Then, the scanning laser beam is irradiated to the recording paper 10 being fed between the cover glass 34 and the feed roller 33 while scanning the recording paper 10 in the width direction thereof perpendicular to the direction in which the recording paper 10 is fed. More specifically, the recording paper 10 is main-scanned by the movement thereof and the laser beam sub-scans the recording paper 10 in the width direction thereof perpendicular to the direction in which the recording paper 10 is fed.

With this arrangement, the image is drawn on the surface of the recording paper 10 by using the dots of the laser beam.

When the laser beam is irradiated, the blue of the cyanine type pigment IR820B only at the portion of the photoconductively-color-changing layer 12 of the recording paper 10 to which the laser beam is irradiated is changed to colorless and transparent. As a result, the color of the recording paper 10 appears and thus the image can be drawn without the need for the processes such as development, fixing and the like.

The recording paper 10 to which the image has been drawn is discharged as it is.

Next, a second embodiment of the printer shown in FIG. 6 will be described.

Figure 6:
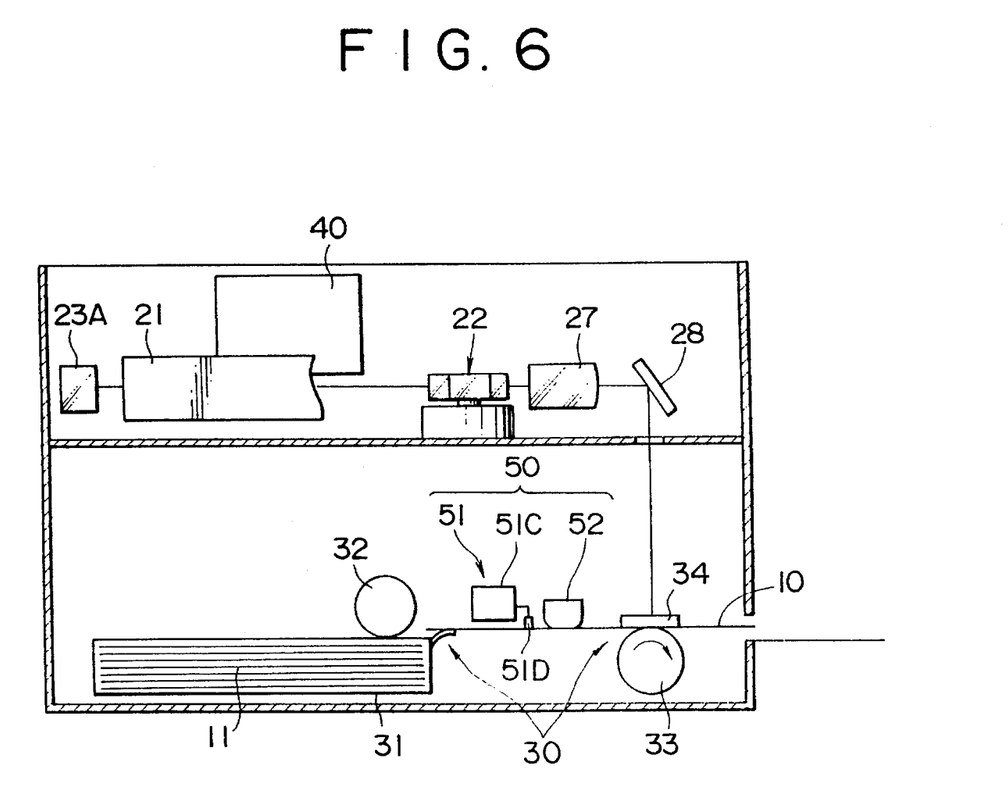
FIG. 6 is a diagram showing the schematic arrangement of a second embodiment of the printer.

The printer shown in FIG. 6 is substantially the same as the aforesaid embodiment except that the arrangement of a photoconductively-color-changing agent coating mechanism 51 is different from that of the aforesaid embodiment. The same numerals as used in the first embodiment are used in the second embodiment to designate the same parts and the description thereof is omitted.

The photoconductively-color-changing agent coating mechanisms 51 of this embodiment is composed of a heater 52, ink tank 51C and felt coating member 51D. The ink tank 51C and felt coating member 51D are disposed on the upper stream side of the heater 52 from which a recording paper 10 is fed. A solution in the ink tank 51C is impregnated and supplied to the felt coating member 51D. The felt coating member 51D interferes with the feed path of the recording paper 10 and comes into contact with the surface of a usual paper 11 being fed.

The ink tank 51C contains the solution of a photoconductively-color-changing agent prepared by uniformly mixing cyanine type pigment IR820B, organic born ammonium salt and binder at a predetermined ratio and supplies the solution to the felt coating member 51D. Thus, the solution of the photoconductively-color-changing agent is coated to the surface of the usual paper 11 being fed through the felt coating member 51D.

The solution of the photoconductively-color-changing agent coated to the usual paper 11 is dried by the heater 52 so that the photoconductively-color-changing agent is fixed on the surface of the usual paper 11 by the melted binder. With this arrangement, a recording paper 10 composed of the usual paper 11 and a photoconductively-color-changing layer 12 formed thereon is prepared.

Next, a copy machine as a third embodiment of the imaging device according to the present invention shown in FIG. 7 will be described. Note, a recording paper feed mechanism 30 and photoconductively-color-changing layer formation mechanism 50 have the same arrangement as those of the aforesaid first embodiment of the printer and thus the description thereof is omitted by designating them with the same numerals.

Figure 7:
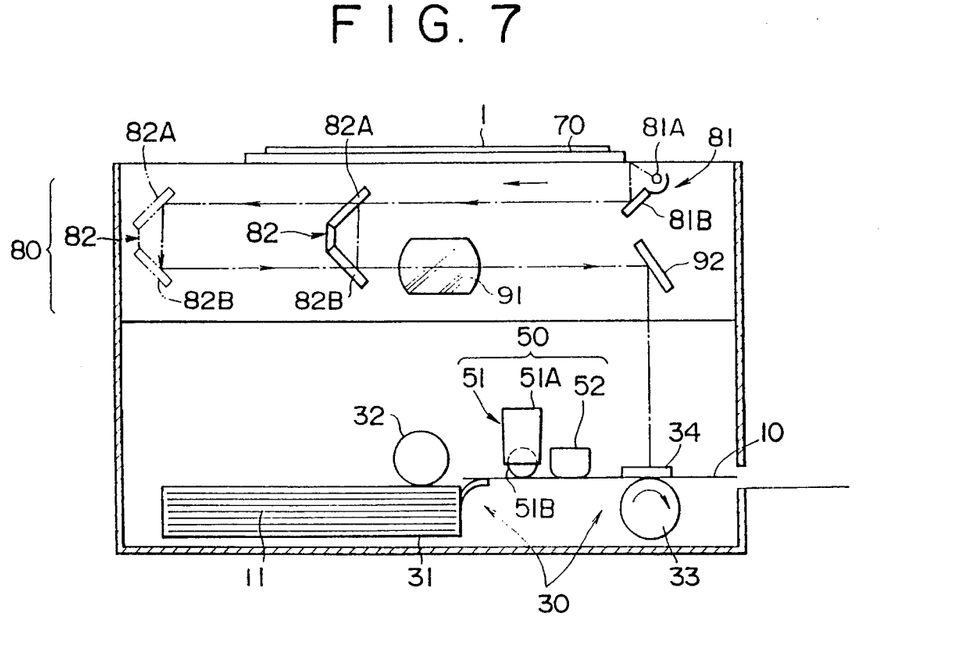
FIG. 7 is a diagram showing the schematic arrangement of a copy machine as an embodiment of the imaging device.

The copy machine shown in FIG. 7 includes a document table 70 having an upper surface composed of a transparent glass plate. A scanning mechanism 80 and focusing optical system 90 are disposed below the document table 70 (on the inner side of the copy machine).

The scanning mechanism 80 has the same arrangement as that of a conventionally known copy machine and includes a full-speed unit 81 and half-speed unit 82. The full-speed unit 81 is moved in parallel with the document table 70 at a predetermined speed. The half-speed unit 82 is moved at a speed one half the speed of the full-speed unit 81 in synchronism therewith in the same direction as the full-speed unit 81.

The full-speed unit 81 is composed of a light source 81A and mirror 81B. The light source 81A irradiates a document 1 placed on the upper surface of the document table 70 with the document surface thereof facing downward (on the document table 70 side). The mirror 81B horizontally reflects a light reflected from the irradiated portion of the document 1 (the image light of the document 1) to the half-speed unit 82 located on the left side of the full-speed unit 81 in FIG. 7. The light source 81A emits near infrared rays laving a wavelength of 820 nm.

The half-speed unit 82 is composed of two mirrors, a mirror 82A and mirror 82B having reflecting surfaces disposed at right angles. Further, the open side of the half-speed unit 82 is directed to the full-speed unit 81. The half-speed unit 82 reflects and reverses the image light of the document 1 from the full-speed unit 81 and supplies the same to the focusing lens 91 of the focusing optical system 90 to be described later.

As described above, the half-speed unit 82 is moved at the speed one half that of the full-speed unit 81 in synchronism with the movement thereof in the same direction as the full-speed unit 81. With this arrangement, the length of the light path from the portion (document scanning portion) of the document 1 irradiated by the light source 81A of the full-speed unit 81 to the focusing lens 91 is fixed.

The focusing optical system 90 is composed of the focusing lens 91 and a mirror 92. The focusing lens 91 having a predetermined focusing length is fixedly disposed at a position to which the image light of the document 1 is supplied from the half-speed unit 82. The mirror 92 reflects and bends downward at right angles the image light of the document 1 passing through the focusing lens 1 and introduces the same to the recording paper 10 fed by the recording paper feed mechanism 30.

When the copy machine copies an image at the same ratio of size, the focusing lens 91 need only have a fixed focusing distance, whereas when the copy machine copies an image at a changing ratio of size, the focus lens employs a zoom lens by which a focusing distance can be changed without changing a focusing position. Note, the focusing position of the focusing lens 91 is set at the upper surface of the recording paper 10 fed by being held between the cover glass 34 and the feed roller 33 of the recording paper feed mechanism 30.

The scanning mechanism 80 arranged as described above scans the document 1 placed on the upper surface of the document table 70 with the document surface thereof facing downward (on the document table 70 side). At this time, the scanning mechanism 80 irradiates the document i by the light source 81A of the full-speed unit 81 and moves in parallel with the document table 70 at a predetermined speed. The half-speed unit 82 moves at the speed one half that of the full-speed unit 81 in synchronism with the scanning and movement of the full-speed unit 81. The image light of the document 1 irradiated by the light source 81A is reflected by the mirror 81B of the full-speed unit; 81 and then incident on the focusing lens 91 of the focusing optical system 90 by being reflected by the mirrors 82A and 82B of the half-speed unit 82.

The focusing optical system 90 converges the image light of the document 1 supplied from the half-speed unit 82 by the focusing lens 91 and reflects the same through the mirror 92. As a result, the image light is bent to intersect the recording paper fed by the recording paper feed mechanism 30 at right angles. With this arrangement, the image of the document focuses on the upper surface of the recording paper 10 fed by being held between the cover glass 34 and the feed roller 33.

The recording paper feed mechanism 30 feeds the usual paper 11 from the base paper tray 31 by the introduction roller 32. The photoconductively-color-changing layer formation mechanism 50 forms the photoconductively-color-changing layer 12 on the upper surface of the usual paper 11 fed by the recording paper feed mechanisms 30. At this time, the recording paper 10 is fed at a speed similar to the document scanning speed of the aforesaid full-speed unit 81.

With the copy machine arranged as described above, when an image is formed, the recording paper feed mechanism 30 feeds the usual paper 11 from the base paper tray 31 by the introduction roller 32; the photoconductively-color-changing layer formation mechanism 50 forms the photo-conductively-color-changing layer 12 on the upper surface of the usual paper 11 fed by the introduction roller 32; the full-speed unit 81 starts to scan the document in synchronism with the arrival of the extreme end of the recording paper fed by the recording paper feed mechanism 30 at the position where the image of the document 1 is focused by the focusing lens 91; and the image of the document 1 is focused on the recording paper 10. With this arrangement, the photoconductively-color-changing layer 12 of the recording paper 10 corresponding to the bright portion of the document I is changed to colorless and transparent to have the color of the usual paper 11. As a result, a copy corresponding to the bright portion and dark portion of the document 1 can be obtained. Thereafter, the recording paper 10 is discharged to the outside of the copy machine. The recording paper 10 to which the document 1 is copied does not need the processes of development, fixing and the like in the same way as the aforesaid embodiments.

Figure 8:
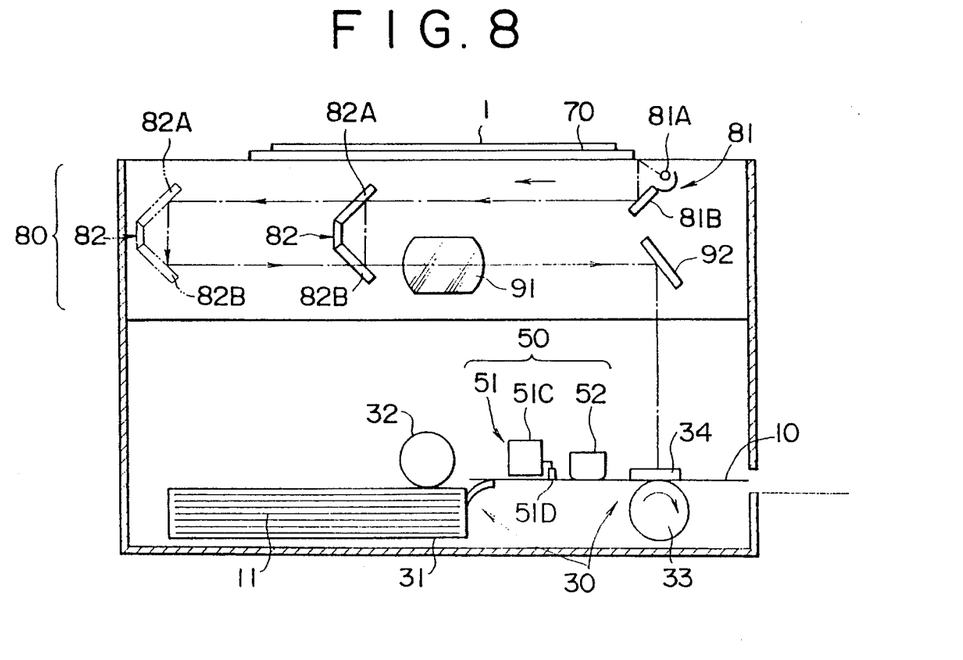
FIG. 8 is a diagram showing the schematic arrangement of a second embodiment off the copy machine.

FIG. 8 shows an embodiment the copy machine to which a photoconductively-color-changing layer formation mechanism similar to that of the second embodiment is applied to the photoconductively-color-changing formation mechanism 50 of the embodiment of the above copy machine. This embodiment operates in the same manner as that of the aforesaid copy machine.

The present disclosure relates to subject matters contained in Japanese Patent Applications No. HEI 3- 261010 and No. HEI 3-261011 each filed on Sep. 12, 1991, which are expressly incorporated herein by reference in their entirety.

What is claimed is:

1. An imaging device using a recording paper having a base paper exhibiting a prescribed color and a photoconductively-color-changing layer formed of a photoconductively-color-changing agent having the characteristic that said agent usually exhibits a specific color different from that of said base paper and is changed to become colorless or transparent by being irradiated with a light having a specific wavelength, said photoconductively-color-changing layer being formed on a surface of said base paper; said imaging device comprising:

means for receiving said base paper;

means for applying said photoconductively-color-changing agent onto said base paper;

means for heating said agent whereby to fix said agent to said base paper to form said photoconductively-color-changing layer on said base paper so as to provide a recording paper upon which a desired image may be reproduced;

means for emitting light having said specific wavelength and for introducing said light having said specific wavelength to said photoconductively-color-changing layer to render selective portions of the photoconductively-color-changing layer transparent in accordance with image information of said desired image; and recording paper holding means for holding said recording paper in position to receive said light to form said desired image on said recording paper.

2. The imaging device according to claim 1, wherein said optical system is a scanning optical system for introducing the light from said light source to said recording paper held by said recording paper holding means and scanning said recording paper; and which further comprises:

image drawing control means for turning ON/OFF the light from said light source in synchronism with the scanning carried out by said scanning optical system based on said image information.

3. The imaging device according to claim 2, which further comprises:

recording paper feed means for feeding said recording paper, wherein said scanning optical system scans said recording paper in synchronism with the feed of said recording paper carried out by said recording paper feed means.

4. The imaging device according to claim 1, wherein said photoconductively-color-changing agent is powder mixed with binder particles to be melted by heat; and said photoconduetlvely-color-changing layer formation means includes a roller member for coating said powder photoeonduetlvely-color-changing agent on the surface of said recording paper and heating means for heating said coated photoconductively-color-changing agent and fixing the same on the surface of said recording paper.

5. The imaging device according to claim 1, wherein said photoconductively-color-changing agent is a liquid mixed with binder to be melted by heat; and said photoconductively-color-changing layer formation means includes coating means for coating said liquid photoconductively-color-changing agent on the surface of said recording paper and heating means for heating said coated photoconductively-color-changing agent and fixing the same on the surface of said recording paper.

6. The imaging device according to claim 1, which further comprises:

document holding means for holding a document;

recording paper holding means for holding said recording paper; and irradiating means for irradiating the document held by said document holding means with a light having said specific wavelength, and wherein said optical system introduces a light reflected from said document to said recording paper held by said recording paper holding means.

7. The imaging device according to claim 6, which further comprises:

scanning means for optically scanning and irradiating said document with an irradiating light with a specific wavelength; and recording paper feed means for feeding said recording paper in synchronism with a document scanning speed of said scanning means, and wherein said optical system introduces a light reflected from said document scanned and irradiated by said scanning means to said recording paper fed by said recording paper feed means.

8. The imaging device according to claim 7, which further comprises:

photoconductively-color-changing layer formation means for forming said photoconductively-color-changing layer on the surface of said base paper.

9. The imaging device according to claim 8, wherein said photoconductively-color-changing agent is powder mixed with binder to be melted by heat; and said photoconductively-color-changing layer formation means includes a roller member for coating said powder photoconductively-color-changing agent on the surface of said recording paper and heating means for heating said coated photoconductively-color-changing agent and fixing the same on the surface of said recording paper.

10. The imaging device according to claim 9, wherein said photoconductively-color-changing agent is a liquid mixed with binder to be melted by heat; and said photoconductively-color-changing layer formation means includes coating means for coating said liquid photoconductively-color-changing agent on the surface of said recording paper and heating means for heating said coated photoconductively-color-changing agent and fixing the same on the surface of said recording paper.

* * * * *